United States Patent [19]
Harrison

[11] 3,718,259
[45] Feb. 27, 1973

[54] MECHANICAL SEPARATOR FOR VISCOUS FLUIDS

[75] Inventor: Henry Harrison, Locust Valley, N.Y.

[73] Assignee: Bernd Kalski, Gingerland, Island of Nevis, British W. Indies; a part interest

[22] Filed: June 22, 1971

[21] Appl. No.: 155,598

[52] U.S. Cl. .........................210/109, 210/84, 55/17
[51] Int. Cl. .........................B01d 43/00, B01d 17/00
[58] Field of Search..........210/65, 84, 109, 112, 115, 210/117, 512; 55/17

[56] References Cited

UNITED STATES PATENTS

| 1,349,881 | 8/1920 | Herrick | 210/112 |
|---|---|---|---|
| 3,454,163 | 7/1969 | Read | 210/84 |
| 3,465,500 | 9/1969 | Fenn | 55/17 |
| 3,616,911 | 11/1971 | Ronaigues | 210/84 |

Primary Examiner—John Adee
Attorney—Cushman, Darby & Cushman

[57] ABSTRACT

A device for separating fluids of disparate viscosities includes a main flow passage for the fluids defined between a pair of opposed surfaces, a reduced portion defined by said surface for constricting flow in a direction transverse to the main flow passage, a pump for forcing the fluids through said main flow passage, a motor for producing relative movement between said surfaces transverse to the direction of the main flow passage and at least one valve disposed adjacent said reduced portion and spring biased into the closed portion until the pressure in this area, which is proportional to the viscosity of the fluid passing through the area, reaches a predetermined value.

There may be several valves adjacent the reduced portion and they may be set to open at various pressures. In addition, the passage may be defined by a cylindrical shaft eccentrically mounted within a cylindrical tube, by a pair of generally parallel opposed flat plates with a ridge raised on one plate, by a non-cylindrical shaft within a cylindrical tubing or by a cylindrical shaft within a noncylindrical tubing. More than one reduced portion may be produced by any but the first set of elements.

13 Claims, 4 Drawing Figures

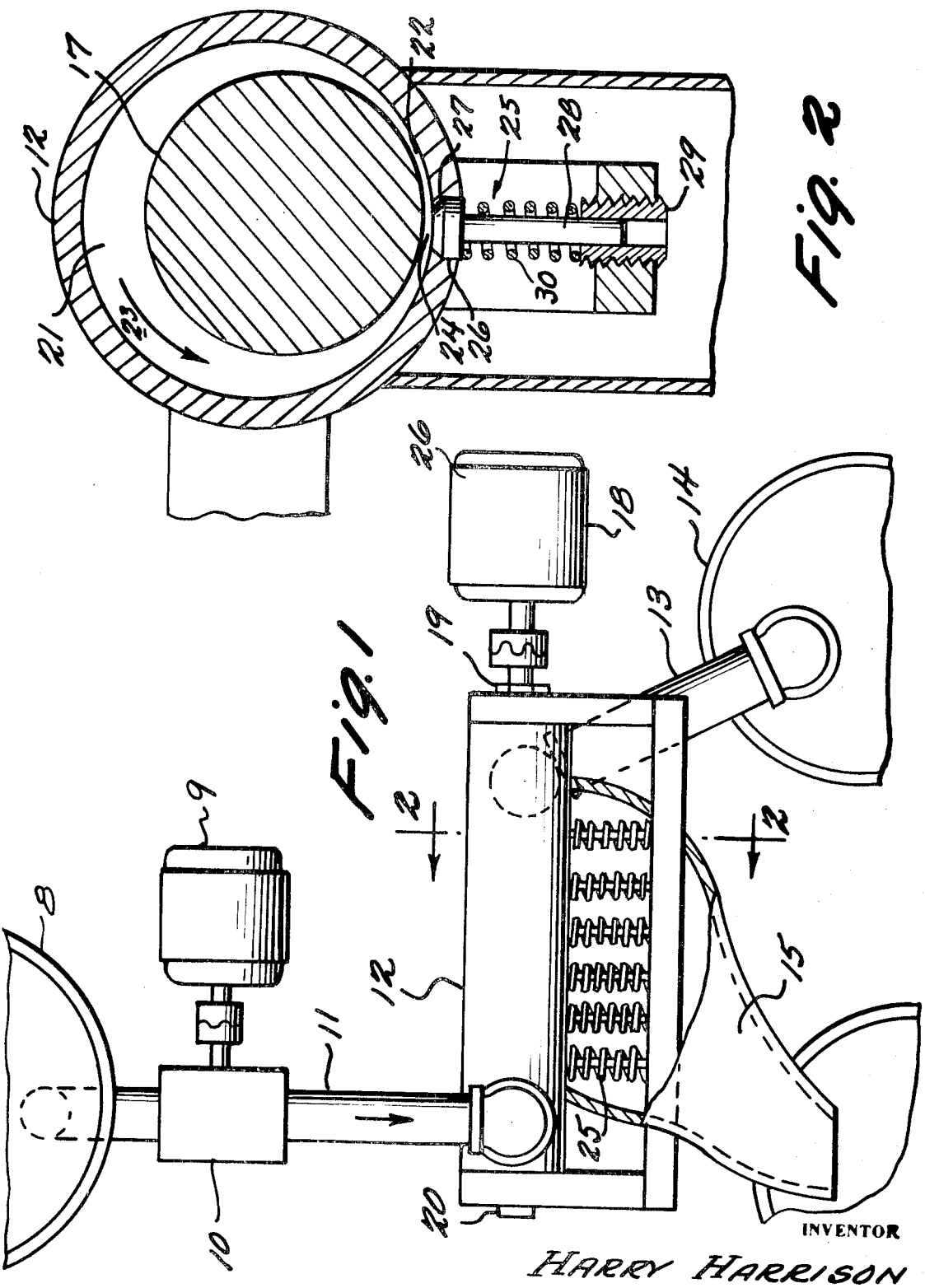

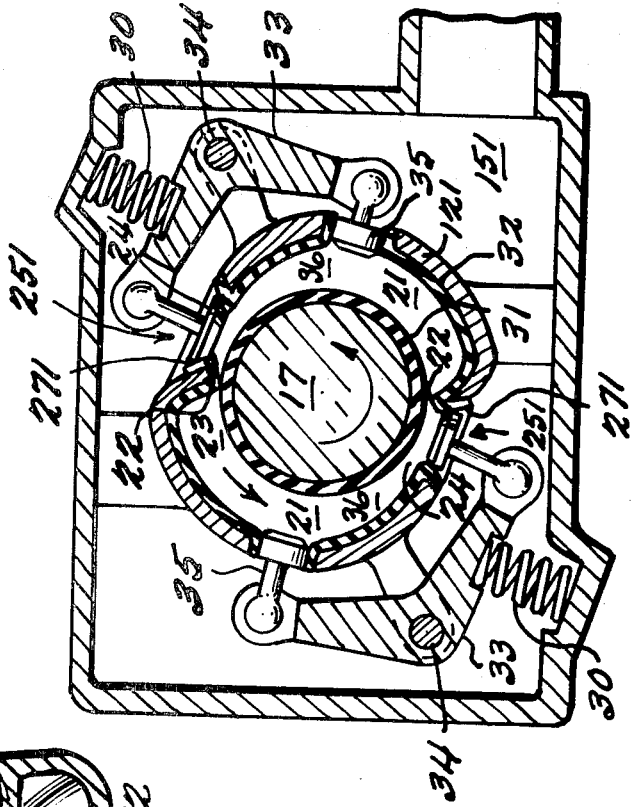
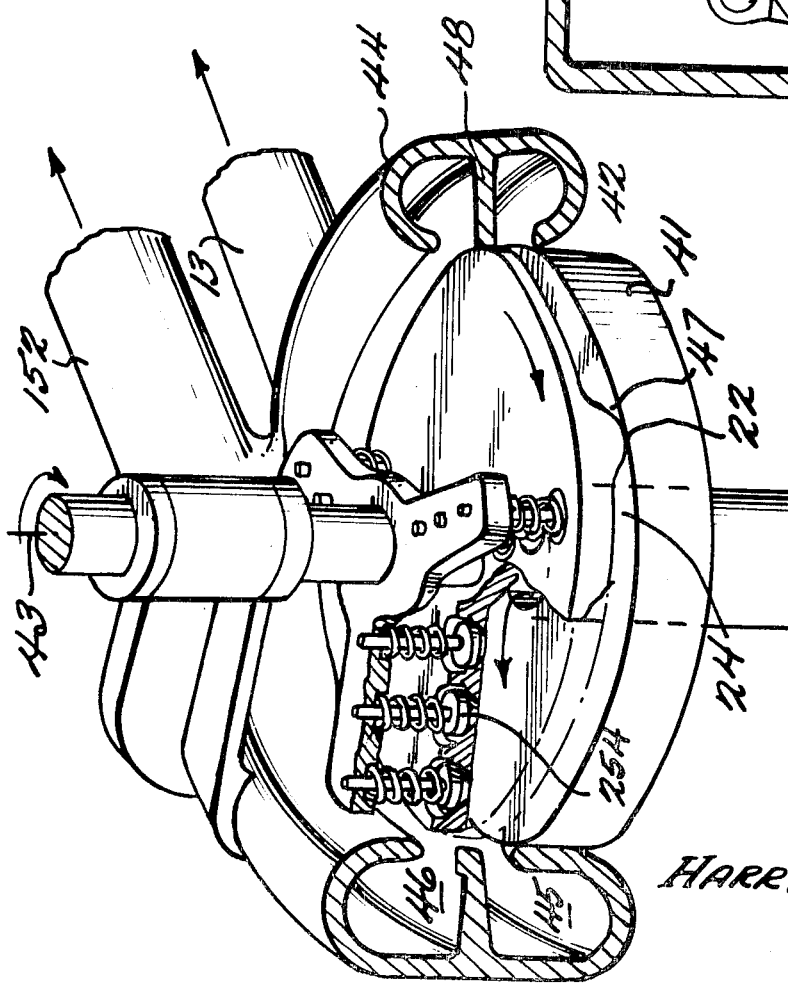

MECHANICAL SEPARATOR FOR VISCOUS FLUIDS

BACKGROUND OF THE INVENTION

1. Field of the Invention

This invention relates to devices for separating fluids of different viscosities and more particularly, to devices for separating oil from water.

2. Description of the Prior Art

The bilge water which collects in the holds of all ocean going ships and especially oil tankers is known to contain a considerable amount of fuel oil. If this fuel oil is not removed prior to dumping the output of conventional bilge pumps into the sea, the oil may drift to shore where it could cause well-known harm to animal and plant life. Of course, the problem of separating oil from water also arises in other environments such as land based fuel tanks.

In any event the loss of fuel oil creates a significant economic loss. Thus, it is highly desirable to separate the oil and water and return the oil to the fuel or storage tanks.

Prior art devices for separating fluids operated on basically two scientific principles: centrifugal separation and stratification by density followed by skimming. Centrifugal separation is an inappropriate method for separating fuel oil from water since these fluids are of nearly equal density and thus, emulsification often takes place when an oil and water mixture is subjected to great centrifugal force by a rotation of about 15,000-30,000 rpm.

The stratification and skimming method is a well-known technique for separating oil from water but this technique requires a storage area having a large surface and also requires a relatively long time during which the oil-water mixture is at rest before the oil stratifies at the top of the storage area. Thus, since bilge pumping is a continuous process in ocean going vessels, the stratification technique is inappropriate in this environment.

Fortunately, the viscosities of water and fuel oil vary from one another which provides a basis for an efficient separation technique in the bilge pump environment.

SUMMARY OF THE INVENTION

It is a primary object of this invention to bring about a separation of two liquids having nearly equal density but substantially different viscosity, such as water and crude petroleum oil. A secondary object is to make this separation continuously on a continuous and practically rapid flow of arbitrary proportions of the two fluids. In order to make as complete a separation as possible, it is an object to minimize emulsification of the two fluids in each other. It is a further object to provide a device for separating fluids of differing viscosity which has the ruggedness, simplicity, and durability to perform its function without maintenance under field conditions for long periods of time. Other objects will become apparent upon study of the following description and drawings of an operating embodiment of my invention.

In this separator, the fluid to be analyzed and separated flows through a passage bounded by substantially rigid walls, as, for example, the space between a cylindrical core and a surrounding cylindrical tube. One of these walls, for example the surface of the cylindrical core, is in motion in a direction transverse to the fluid flow, as by rotation of the core on its axis. By virtue of its viscosity, the fluid in contact with this transversely moving surface is dragged with it, transverse to the main flow direction. If the fluid were able to circulate around the core freely, it would travel in a helical path through the passage. However, the path transverse to the main flow direction diminishes in width at a reduced portion of the passage, for example, by eccentricity of the core within the surrounding cylindrical tube.

When the fluid entrained by the transversely moving surface is rammed into this reduced portion of the passage, its escape is resisted by its viscosity and the pressure of the fluid against the core surface and against the tube wall therefor rises. The pressure distribution which will develop between two circular cylinders of given eccentricity and given radii, and having a fixed relative surface speed, has been intensively studied in relation to hydrodynamic journal bearings. The maximum pressure in a given geometry is proportional to the surface speed and to the viscosity of the fluid. Thus, such an apparatus provides a means for separating fluids of different viscosities.

In a separator as described above, pressure relief valves are provided in the stationary wall in the region of maximum fluid pressure, i.e., near to said reduced portion. These valves are held closed by spring force from outside so that they will not open at the maximum pressure developed in the less viscous fluid component, but will open freely to allow the escape of the more viscous fluid component. Thus when a fluid containing random amounts of a more and a less viscous component is pumped or flushed through the axial passage of this separator, the less viscous and more mobile component will continue along to the end of the passage, while the more viscous component will be forced out of the passage through the escape valves.

BRIEF DESCRIPTION OF THE DRAWINGS

The general operation of this separator having been explained, attention may be turned to the drawings wherein:

FIG. 1 is an external view of a separator according a first embodiment of my invention, showing where the mixed fluid enters and where the two components issue.

FIG. 2 is a section along line 2—2 of the separator of FIG. 1, in which the principal flow is perpendicular to the plane of the paper, showing a typical spring-loaded escape valve.

FIG. 3 illustrates a second embodiment of my invention in which viscous forces are accentuated, and partially balanced.

FIG. 4 shows a separator according to a third embodiment of my invention in which the stationary surface is a plane, and the moving surface is a substantially plane surface having radial undulations, and carrying the escape valves on the moving part.

The same elements are indicated by the same reference numerals throughout the application.

In the separator of FIGS. 1 and 2, the system consists of a pump 10 powered by motor 9 which force the mixture of liquids which may be oil and water from a storage area 8 through a pipe 11 into a separator housing 12. The less viscous liquid is discharged through a pipe 13 into a reservoir 14 while the more viscous liquid exits through valves 25 and trough 15 into a reservoir 16. Thus in an oil-water mixture the water passes from pipe 11 through housing 12 and pipe 13 into reservoir 14 and the oil entering from pipe 11 escapes through spring-loaded valves 25 in the wall of housing 12 into trough 15, through which it flows into reservoir 16.

In addition to the housing 12, which is a pipe of uniform circular cross-section, the separator includes a cylindrical core 17, mounted for rotation in journal bearings 19 and 20 near the ends of housing 12 and coupled to a driving motor 18. The axis of the core 17 is parallel to the axis of the housing 12, and since the diameter of the core is substantially less than the inside diameter of the housing, the moving core surface is spaced apart from the housing by a substantial distance at 21 but is very close to the housing at 22. Thus there is a passage at 21 of substantial cross-section for fluid flow along the axial direction of the housing. However, mixture of fluids is driven by the turning core 17 surface in the helical direction as indicated by the arrow 23. Thus the fluids tend to circulate around the core 17, and thus pass through the very narrow constriction at 22. Ramming the fluid into the diminishing passageway between the core and the housing in this way produces a pressure in the fluid which is proportional to the viscosity of the fluid, and this pressure is greatest at some region 24 just ahead of the constriction at 22.

The valves 25 set into openings in the wall of the housing at region 24, are designed to stay closed when the pressure is low, corresponding to low-viscosity water, but to open when the pressure is high, corresponding to higher-viscosity oil. Thus water is prevented from escaping through the valves 25, but oil is forced out through the side of the housing into the trough 15.

As is best seen in FIG. 2, each valve 25 consists of a head 26, bearing against a valve seat 27 bored into the side of the housing 12, and a stem 28 sliding freely in a threaded adjustment sleeve 29. Around each valve stem and pressing against the valve head is a compression spring 30. Advancing or withdrawing the adjustment sleeve 29 increases or decreases the compression of the spring, which adjusts the pressure limit at which the valve will open.

The capacity of the valve to distinguish between fluids of slightly different viscosity is improved by using springs of low stiffness, so that only a slight increase of pressure is required to open the valve wide. The capacity of the separator to distinguish between portions of a flow which have different viscosity is related to the size of the individual valves and the separation 22 between core 17 and the housing 12. Closely spaced small valves are best suited to distinguishing local variations in pressure caused by local bubbles or regions of high viscosity. Closely spaced core and housing walls also tend to localize pressure variations and reduce the volume of an inhomogeneity required to open an individual valve. Any turbulence in pump 10 tends to reduce the scale of inhomogeneity and therefore reduces the effectiveness of the separator system.

The rate at which fluid can be processed is determined by the surface speed of the core relative to the opening between the core and the housing 12 at region 24 and to the length of housing 12. Thus, a processing rate is favored by a high rate of rotation of the core and a long housing.

The power required to drive the separator is proportional to the viscosity, to the square of the rotational speed of core 12, and to the amount of shearing induced in the fluid. The amount of shearing can be reduced by increasing the difference of diameter of the core and housing. The effect of the escape valve is to reduce the amount of shearing by reducing the flow of higher viscosity fluid opposite to the direction of arrow 23. Thus an upper limit to the power losses can be derived from well-developed formulas of hydrodynamic journal bearing technology. In other words, the spring-loaded valves 25 minimize the power output required from motor 18.

It is well known that the boundary between two fluids of different viscosity is unstable in conditions of shearing flow, and mixing takes place. If the two fluids are nominally "immiscible," they may nevertheless be stirred together until the inhomogeneity is on a very fine scale, a process known as emulsification. Over a wide range of composition, emulsions typically have a viscosity greater than either component, and almost always greater than that of the lower viscosity component. Thus emulsions will generally tend to be separated out with the higher viscosity component. Clearly, production of emulsions tends to interfere with precise separation of the two components, oil and water. The primary factor contributing to the formation of emulsions is that water and oil must be present in the same region where vigorous shearing flow is taking place. When the scale of the inhomogeneities in the fluid stream is very large compared to the size of the shearing region associated with one escape valve, emulsion is formed infrequently, and thus forms a small percentage of the separated fluid. On the other hand, if the scale of inhomogeneities on the flow is very small, compared to the active region around a separator valve, the separator will be inefficient in distinguishing between the two components.

To minimize the production of emulsion, the active region of the separator should be small, and the pressure gradients should be steep, facilitating the escape of the more mobile water from the region of high shear rates. Also the separation should be substantially completed in one pass, so that the constriction at 22 permits only a thin film of the higher viscosity oil to recycle, and practically none remains in the region of the escape valve when water arrives.

The bearings 19 and 20 which support the rotating core must have sufficient radial load carrying capacity to withstand the hydrodynamic pressure of the more viscous oil in the constricted passage at 24. This pressure is no greater than the pressure of a hydrodynamic bearing of the same speed and dimensions and having lubricant of the same viscosity, and is limited by the spring-loaded valves in the region immediately surrounding the valves. Thus the load carrying capacity required in bearings 19 and 20 is minimized by the same factors that affect power losses.

FIG. 3, a section view corresponding to FIG. 2, illustrates a refined embodiment of the separator according to my invention in which corrosion and abrasion effects have been reduced and pressures resulting from hydrostatic head and water hammer have been cancelled out. It also shows how the separator can be made more compact in the axial direction, and how undesired power losses and unbalanced hydrodynamic radial pressures can be minimized.

In FIG. 3, the core 17 has a resilient rubber-like coating 31, for example of polyurethane, and the housing 121 has a similar resilient internal coating 32. These coatings protect the core and the housing, respectively, from corrosion by the processed fluid, which may contain salt water, for example, or other corrosive substances; and at the same time these coatings have sufficient resilience to pass particles like sand or shell, which may be suspended in the fluid, through the constriction 22 without permanent damage to the core and housing surfaces.

In this embodiment, the valves 251 are mounted so as to be held closed in their seats 271 in housing 121 by levers 33 hinged about pivots 34 which are, in turn, rigidly attached to housing 121. Pistons 35 fitted in the wall of housing 121 in the wide passage region 21 bear on the other end of levers 33. Compression springs 30 also bear up on the arms of levers 33 adjacent the valves 251.

The more viscous fluid component which escapes through valves 251 is conducted away from the separator through a closed passage 151, and the outer sides of both the pistons 35 and the valves 251 are contained in the passage 151 and therefore subjected to the same discharge pressure.

Since the area of the piston 35 is designed to be equal to the area of the valve 251, and since the hydrostatic pressure between core 17 and housing 121 is exposed to both piston 35 and valve 251, the force tending to open valve 251 against spring 30 is only the force resulting from viscosity of the fluid, i.e., the system is balanced against hydrostatic pressure both inside the housing 121 and inside the escape passage 151. In some applications that is important, because a sudden change in composition of the fluid entering the housing causes a sudden change in the distribution of flow between the two outlet pipes, 13 (not shown in FIG. 3) and 151. This sudden change in flow causes a dynamic "water hammer" pressure which would keep the valves 251 open or closed longer than required if the valves were not hydraulically balanced. The precision of separation of the two fluid components thus depends on eliminating such effects of dynamic flow changes. Balancing of the valves also eliminates calibration changes caused by varying hydrostatic pressure resulting from pump speed variations, filling or emptying of tanks, or other causes.

The inside contour of housing 121 of FIG. 3 is not circular but a modified oval. Thus there are two main flow passages 21, two constrictions 22 and two maximum pressure regions 24. There are also two rows of valves 251. This constitutes a force-balanced system as long as the fluid is the same on both sides of the rotor or core. There being no radial force on the bearings 19 and 20, they can be eliminated, and the core becomes self-supporting on its own dynamic fluid film. However, when a sudden change of composition of the fluid takes place, the viscosity of the fluid on one side will differ momentarily from the viscosity on the other side. Under these conditions, the core axis will shift toward the side with the lower viscosity until the pressures at the two regions 24 are equal. Then during that moment either the low viscosity fluid will escape or the high viscosity fluid will not, and there will be a momentary failure of separation. In applications where this momentary failure of separation is not tolerable, the bearings 19 and 20 must be used.

The inside contour of housing 121 is also modified to maximize the main flow passage, maximize the viscous pressure effect, minimize the power-consuming viscous drag, and minimize the pressure area. The wide main-flow passage area begins just beyond the close constriction 22. Fluid entrained by the core surface is rammed into a short entrance area 36 followed by the escape valves at the maximum pressure area 24. The close constriction 22 is immediately adjacent to the maximum pressure area, and is very narrow. Since pressure area is only a little wider than the escape valves the force on bearings 19 and 20 produced by viscous pressures is moderate. Since the width of the constriction 22 is small, the viscous drag is small. Finally, since there are now two valves 251 along the axis of housing 121 at each radial location, the housing 121 need not be as long as housing 12 for the same input.

FIG. 4 illustrates a third embodiment of this invention in which the main flow path is radially disposed between a pair of plates. One plate 41 is stationary and the other 42 is turning about a perpendicular axis 43. Wavelike ridges 47 on the surface of plate 42 approach plate 41 closely, forming radial constrictions 22. As plate 42 turns, fluid moving in a generally radial direction through the main flow passages 21 is drawn in the direction shown by arrow 231 by contact with plate 42 and is thus wedged into the high pressure region 24. If the pressure in this region is high enough, corresponding to high viscosity of the flowing fluid, the fluid is forced out through valves 254 set in the rotating surface of plate 42.

This embodiment has several features in addition to features already explained in relation to the embodiments of FIGS. 1 and 2. A primary advantage is that it acts like a centrifugal pump, flinging both the lower viscosity component and the higher viscosity component of the fluid radially, but at different axial zones. The momentum of the output fluids is captured in a spiral housing 44 having side by side passages 45 and 46 which are separated from one another by webbing 48. The webbing 48 provides a close running fit or sliding seal with respect to plate 42, and thus the output fluids are delivered with moderate pressure to pipes 13 and 152 which conduct the low and high viscosity components, respectively, of the fluid to suitable tanks, reservoirs, or output areas. Input fluid is supplied to the region between the plates by pipe 11, connected in the center of plate 41.

Experience with the embodiment of FIG. 2 has shown that a relative surface speed of about 4,000 feet per minute is suitable for separating light oil from sea water. If the plate 42 shown in FIG. 4 is rotated with respect to plate 41 to achieve such a relative surface speed, a tangential fluid speed of about 2,000 feet per minute or 33 feet per second is produced at the passages 45 and 46 which is equivalent to a head of about 17 feet. Thus size of pump 10 may be reduced or pump 10 may even be eliminated in systems using the embodiment of FIG. 4.

A second advantage of this embodiment is that it can readily be constructed by casting or by milling the surface of plate 42 so that there are several ridges of close constriction, and in the event that wear takes place, these constrictions can easily be restored by grinding or turning on a lathe.

While the above description fully covers the preferred embodiments, numerous modifications may be made thereto within the scope of the invention. Thus, for example the embodiment of FIGS. 1 and 2 can be modified by adjusting one set of valves 25 to release at a different pressure from another set of valves 25 and providing separate roughs and separate tanks for each set of valves. Naturally, in this case, the valves axially nearer to the fluid input to housing 12 will be set to open at a higher pressure than those valves nearer to the lowest viscosity fluid outlet.

It will be evident that the components of differing viscosity need not be immiscible to be separated by this device, but only unmixed. It will also be clear that a separator of this kind could be made to analyze a fluid stream into a larger number of viscosity ranges than two, simply by providing more different valve adjustment pressures and corresponding separate escape channels. The length of the separator required to separate each given component is the length required to bring the whole flow into engagement with the high pressure area. Thus a longer separator is required when the main flow speed is higher with respect to the rotational surface speed of the core.

Now that several embodiments of this invention and a modification thereto have been described, it will be apparent that the primary objective, which is to separate fluids into components on the basis of viscosity, without regard to their density, compressibility, or other properties, has been successfully achieved. Also, several secondary design objectives, including simplicity of construction, continuous processing, moderate power requirement, and capacity to separate fluids having inhomogeneity of moderately small scale, have been accomplished.

The scope of this invention will now be defined by the following claims.

What is claimed is:

1. A device for separating fluids according to their viscosity comprising a pair of opposed surfaces defining therebetween a main flow passage for said fluids and including at least one reduced portion for constricting flow transverse to the direction of the main flow passage, a means for forcing the fluids to be separated through said main flow passage, a means for creating relative movement between said surface transverse to the direction of the main flow passage, and valve means disposed adjacent said reduced portion which is adapted to permit escape of fluid from said passage into an outer chamber when the pressure within said reduced portion exceeds a predetermined limiting pressure.

2. A device according to claim 1 in which said main flow passage is the space between an inner, rotating cylinder and an outer, stationary cylinder, and the said reduced portion in said passage results from eccentricity of mounting of the inner cylinder with respect to the outer cylinder.

3. A device according to claim 2 in which said valve means is a poppet valve biased by a spring to remain closed when the fluid pressure against the piston within the reduced portion is less than an adjustable limiting force, and to open when the fluid pressure against the piston is greater than said adjustable limiting force.

4. A device according to claim 2 in which said valve means is a plurality of poppet valves arranged side by side along the length of the outer cylindrical wall.

5. A device according to claim 4 in which said poppet valves are biased to remain closed by adjustable spring means, said adjustable spring means being adjusted to permit at least one valve to open at one fluid pressure, and at least one other valve to open at another fluid pressure.

6. A device according to claim 1 in which said valve means is balanced against pressure in said main flow passage and biased closed by a fixed force.

7. A device according to claim 6 in which said valve means is also balanced against pressure in said outer chamber into which it permits fluid to escape.

8. A device according to claim 1 in which the main flow passage is the space between an inner surface of circular cross-section and an outer surface of non-circular cross-section.

9. A device according to claim 8 in which said outer surface approaches said inner surface closely in more than one portion of its contour.

10. A device according to claim 1 in which the main flow passage is the space between an outer surface of circular cross-section contour and an inner surface of non-circular cross-section.

11. A device according to claim 1 in which at least one of the surfaces defining the main flow passage is coated with a rubber-like material.

12. A device according to claim 1 in which said main flow passage comprises the space between two substantially planar walls, one of which has at least one substantially radial ridge projecting toward the other and has a rotational motion parallel to the surface of the other, said valve means being carried on the wall supporting said moving ridged substantially adjacent said ridge but slightly ahead thereof in the direction of movement of the rotating wall.

13. A device according to claim 1 in which said opposed surfaces are covered with resilient material.

* * * * *

UNITED STATES PATENT OFFICE
CERTIFICATE OF CORRECTION

Patent No. 3,718,259        Dated February 27, 1973

Inventor(s) HENRY HARRISON

It is certified that error appears in the above-identified patent and that said Letters Patent are hereby corrected as shown below:

<u>In the Drawings:</u>

Change name of inventor from "Harry Harrison" to --Henry Harrison--.

Signed and sealed this 20th day of November 1973.

(SEAL)
Attest:

EDWARD M. FLETCHER, JR.         RENE D. TEGTMEYER
Attesting Officer                 Acting Commissioner of Patents